US 6,662,568 B2

(12) United States Patent
Shimizu et al.

(10) Patent No.: US 6,662,568 B2
(45) Date of Patent: Dec. 16, 2003

(54) HOLLOW STRUCTURE WITH FLANGE

(75) Inventors: Hiroshi Shimizu, Takasago (JP); Mitsuru Kondo, Takasago (JP); Hironobu Hakoda, Takasago (JP); Yukihiro Hashimoto, Takasago (JP); Katsunori Tanaka, Takasago (JP); Sousuke Nakamura, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/378,602

(22) Filed: Mar. 5, 2003

(65) Prior Publication Data

US 2003/0140633 A1 Jul. 31, 2003

Related U.S. Application Data

(63) Continuation of application No. PCT/JP02/06641, filed on Jul. 1, 2002.

(30) Foreign Application Priority Data

Jun. 29, 2001 (JP) ........................................ 2001-198916

(51) Int. Cl.[7] ............................. F02C 7/20; F16L 23/032
(52) U.S. Cl. .......................................... 60/799; 403/335
(58) Field of Search ............................... 403/335, 336, 403/337, 338; 60/752, 805, 799

(56) References Cited

U.S. PATENT DOCUMENTS

| 5,421,624 A | | 6/1995 | Hayashi et al. |
| 5,706,646 A | * | 1/1998 | Wilde et al. ................ 60/39.37 |
| 5,906,093 A | * | 5/1999 | Coslow et al. ................. 60/777 |

FOREIGN PATENT DOCUMENTS

| EP | 1 035 377 | 9/2000 |
| EP | 1 152 191 | 11/2001 |
| GB | 1 362 281 | 8/1974 |
| JP | 5-215584 | 8/1993 |
| JP | 6-3267 | 1/1994 |
| JP | 2001-50448 | 2/2001 |
| JP | 2002-243154 | 8/2002 |

* cited by examiner

Primary Examiner—Ehud Gartenberg
(74) Attorney, Agent, or Firm—Oblon, Spivak, McClelland, Maier & Neustadt, P.C.

(57) ABSTRACT

The present invention provides a hollow structure with at least one flange which can eliminate the possibility of creating crackings due to the thermal fatigue, thereby improving the durability thereof. A hollow structure with an flange according to the present invention includes at least one annular flange fixedly attached around the hollow structure which has a temperature gradient in the direction of the thickness of the wall thereof, wherein said at least one annular flange including an outer portion formed of a metal material having a coefficient of linear expansion greater than that of the metal material forming another portion of said at least one annular flange.

8 Claims, 5 Drawing Sheets

HOLLOW STRUCTURE WITH FLANGE

CROSS REFERENCE TO RELATED APPLICATION

This is a Continuation Application of PCT Application No. PCT/JP02/06641, filed on Jul. 1, 2002, which was not published under PCT Article 21(2) in English. This application is based upon and claims the benefit of priority from the prior Japanese Patent Application No. 2001-198916, filed on Jun. 29, 2001, the entire contents of which are incorporated herein by reference.

BACKGROUND OF THE INVENTION

1. Field of the Invention

The present invention relates to a hollow structure with a flange, and more particularly, to a hollow structure with an annular flange having an improved durability.

2. Description of Related Art

A hollow structure with an annular flange attached therearound which has a temperature gradient in the direction of the thickness of the wall of the hollow structure during operation has been utilized in various technical fields.

For example, a conventional gas turbine system includes a plurality of combustors for supplying a working gas, i.e. combustion gas into a gas turbine. Such a plurality of combustors are circumferentially disposed around a central axis of a turbine rotor in an adjacent relationship to each other. Each of the combustors comprises a cylindrical structure including a liner with a combustion nozzle attached at one end thereof and a tail cylinder connected to the liner. The tail cylinder includes an end annular flange at the outer circumference of a discharge opening thereof in order to connect it to a turbine casing.

According to the configuration of the prior art combustion system described above, combustion gas is injected into the inner space of the combustor via one or more combustion nozzles, the combustion gas will be mixed with the air in the inner space, and this mixture then flows longitudinally toward the discharge opening of the combustor, the mixture thereafter being supplied to a turbine rotor.

One drawback of such a prior art combustion system, however, arises due to the fact that a temperature gradient occurs at the end annular flange in the direction of the thickness of the wall of the tail cylinder caused by a difference between the temperature of the inner space and that of the outer environment thereof.

When a gas turbine system is in its normal operating state, the temperature of the inner surface of the tail cylinder will rise significantly due to it being exposed to the combustion gas having a maximum temperature of 1500° C., while the temperature of the outer surface of the tail cylinder will not rise very much since it is cooled by the outer environmental ambient air, so that there may occur temperature gradient of a several hundreds of degrees in the direction of the thickness of the wall of the tail cylinder. Therefore, if the end flange had a discharge opening rectangular in shape, the discharge opening would be deformed due to the wide range of temperature gradient described above, so that long wall sides of the end flange would be bent inwardly while short wall sides thereof would be bent outwardly, resulting in inducing a high level of thermal stress at each of the corners therebetween, thereby possibly creating cracking therein by thermal fatigue.

In order to solve this problem, an apparatus has been proposed which can reduce the range of the temperature gradient in the direction of the thickness of the wall of the tail cylinder. More particularly, the apparatus has a cooling means comprising a flow passage disposed near the inner surface of the tail cylinder to provide a flow path for a coolant fluid therethrough, thereby lowering the temperature of the inner surface of the tail cylinder.

This apparatus, however, has an inherent drawback.

That is, if the temperature of the inner surface and, therefore, the inner space of the tail cylinder is lowered, the efficiency of the gas turbine system will deteriorate.

Another type of a known tubular-shaped hollow structure, such as an exhaust duct, has a plurality of annular flanges fixedly attached to the outer circumference thereof in an equally spaced apart longitudinal relationship with each other. When exhaust gas having a high temperature flows through the exhaust duct, the hollow structure, i.e. the exhaust duct, expands outwardly due to the wide range of a temperature gradient in the direction of the thickness of the wall of the duct, similar to the case of the combustor described above. At this time, since the thermal expansion of the outer surface of the exhaust duct is restricted by each of the plurality of the flanges, the hollow structure is deformed into a wave-like shape in a longitudinal direction thereof, so that each of the portions of the hollow structure at which each of the plurality of the flanges are attached form sinks of the wave, while other portions of the hollow structure located between two adjacent flanges will form peaks of the wave, thereby causing material of which the wall of the hollow structure consists being bent. Thus, the hollow structure will undergo a high level of a thermal stress at the portions where the plurality of the flanges are respectively attached thereto, as in the case of the combustor described above.

It is an object of the invention to provide a gas turbine combustor in which the thermal stress around the end annular flanges thereof can be minimized during normal operation without damaging the efficiency of the gas turbine system.

Another object of the invention is to provide a hollow structure having at least one flange which can eliminate the possibility of crackings being created due to the thermal fatigue, thereby improving the durability thereof.

SUMMARY OF THE INVENTION

The factors which define the thermal expansion of a material generally include a thermal expansion coefficient of the material, an amount of a temperature difference, and a initial length of the material. In the art, the temperature difference has been mainly controlled by cooling the prior high temperature portion of the material at a lower maximum temperature so as to reduce the thermal stress of the end flange of the combustor during normal operation, resulting in damaging the efficiency of the gas turbine system, whereas the present invention, which is based upon controlling the thermal expansion coefficient of the material in order to avoid damaging the efficiency of the gas turbine system, utilizes a plurality of materials having coefficients of linear expansion different from each other at around the end annular flange, thereby reducing the amount of the thermal stress.

The present invention relates to a hollow structure with a flange wherein at least one annular flange is fixedly attached around the hollow structure which has a temperature gradient in the direction of the thickness of the wall thereof comprising said at least one annular flange including an outer portion formed of a metal material having a coefficient of linear expansion greater than that of a metal material different from the former one forming another portion of said at least one annular flange.

In accordance with one aspect of the present invention, by forming a portion of the flange exposed to a lower temperature from a metal material having a coefficient of linear expansion greater than that of a metal material different from the former one forming a portion of the flange exposed to a higher temperature, the difference between the thermal expansion of the higher temperature portion and that of the lower temperature portion will become less due to the larger amount of expansion of the lower temperature portion (so-called bimetal effect) during normal operation, than would be in the case of the higher and lower temperature portions of same materials, resulting in restriction of the hollow structure from being expanded radially outwardly is reduced such that there is less deforming of the hollow structure into a wave-like shape in longitudinal direction thereof, thereby reducing the thermal stress at the portions where each of the plurality of the flanges are attached thereto so as to eliminate the possibility of creating crackings due to the thermal fatigue.

Therefore, in one preferred embodiment of the present invention, a hollow structure is one of a plurality of gas turbine combustors disposed circumferentially around a central axis of a turbine rotor in an adjacent relationship to each other which one of a plurality of gas turbine combustors includes a generally tubular-shaped tail cylinder for providing a flow path for combustion gas flowing longitudinally toward the discharge opening thereof, said tail cylinder having an end annular flange at the outer circumference of the discharge opening thereof for connecting it to a turbine casing, wherein the end annular flange comprises said at least one flange; wherein said end annular flange includes an outer portion formed of a metal material having a coefficient of linear expansion greater than that of a metal material forming another portion of said end annular flange.

In accordance with this aspect of the present invention, by forming a portion exposed to a lower temperature from a metal material having a coefficient of linear expansion greater than that of a metal material different from the former one forming a portion exposed to a higher temperature, the difference between the thermal expansion of the higher temperature portion and that of the lower temperature portion will become less due to the larger amount of expansion of the lower temperature portion (so-called bimetal effect) during normal operation, than would be in the case of higher and lower temperature portions of the same materials, resulting in a reduced amount of bending deformation, thereby reducing the thermal stress due to the deformation, especially at the corner portions thereof, so as to eliminate the possibility of creating crackings due to the thermal fatigue.

Alternatively, the thermal stress at the corner of the discharge opening can be reduced by providing a bimetal structure along either long sides or short sides of this opening.

In accordance with a further aspect of the present invention, said end annular flange includes a first annular portion formed of a first metal material forming a circumferential portion of the discharge opening, and a second annular portion formed of a second metal material having a coefficient of linear expansion greater than that of the first metal material; wherein said first and second annular portions are joined to each other by welding with a flux having a coefficient of linear expansion between that of the first metal material and that of the second metal material.

Preferably, the coefficient of linear expansion of the second metal material is 10% greater than the coefficient of linear expansion of the first metal material.

More preferably, the metal material forming the inner portion of said flange is hastelloy-X, and the metal material forming the outer portion of said flange is A-286 or SUS stainless steel.

DETAILED DESCRIPTION OF THE PREFERRED EMBODIMENT

The features of the preferred embodiment of the combustor in accordance with the present invention will now be described in detail below.

Figure 1:
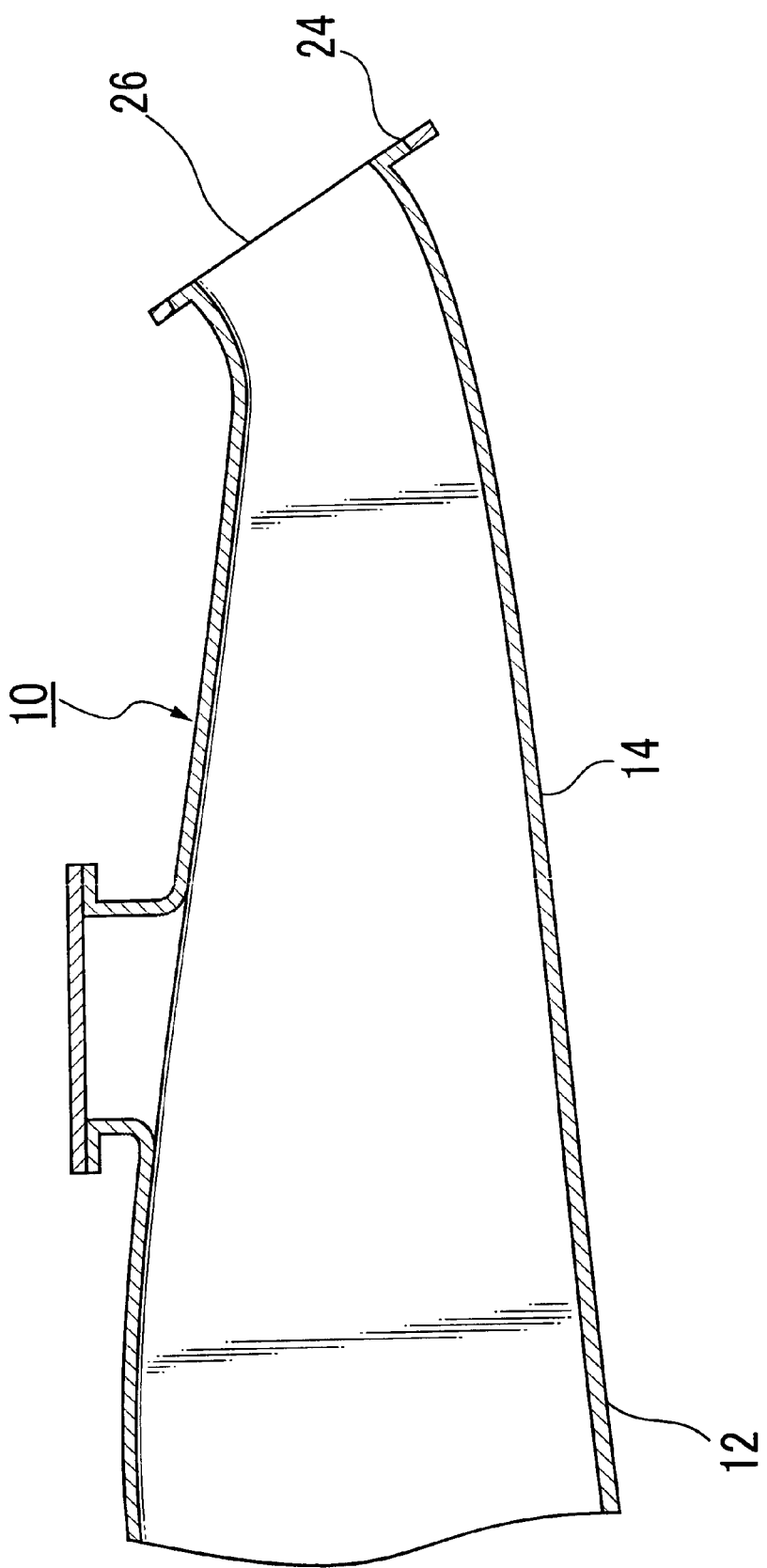
FIG. 1 is an enlarged cross-sectional view of a first preferred embodiment of a tail cylinder of a combustor in accordance with the present invention.
Figure 2:
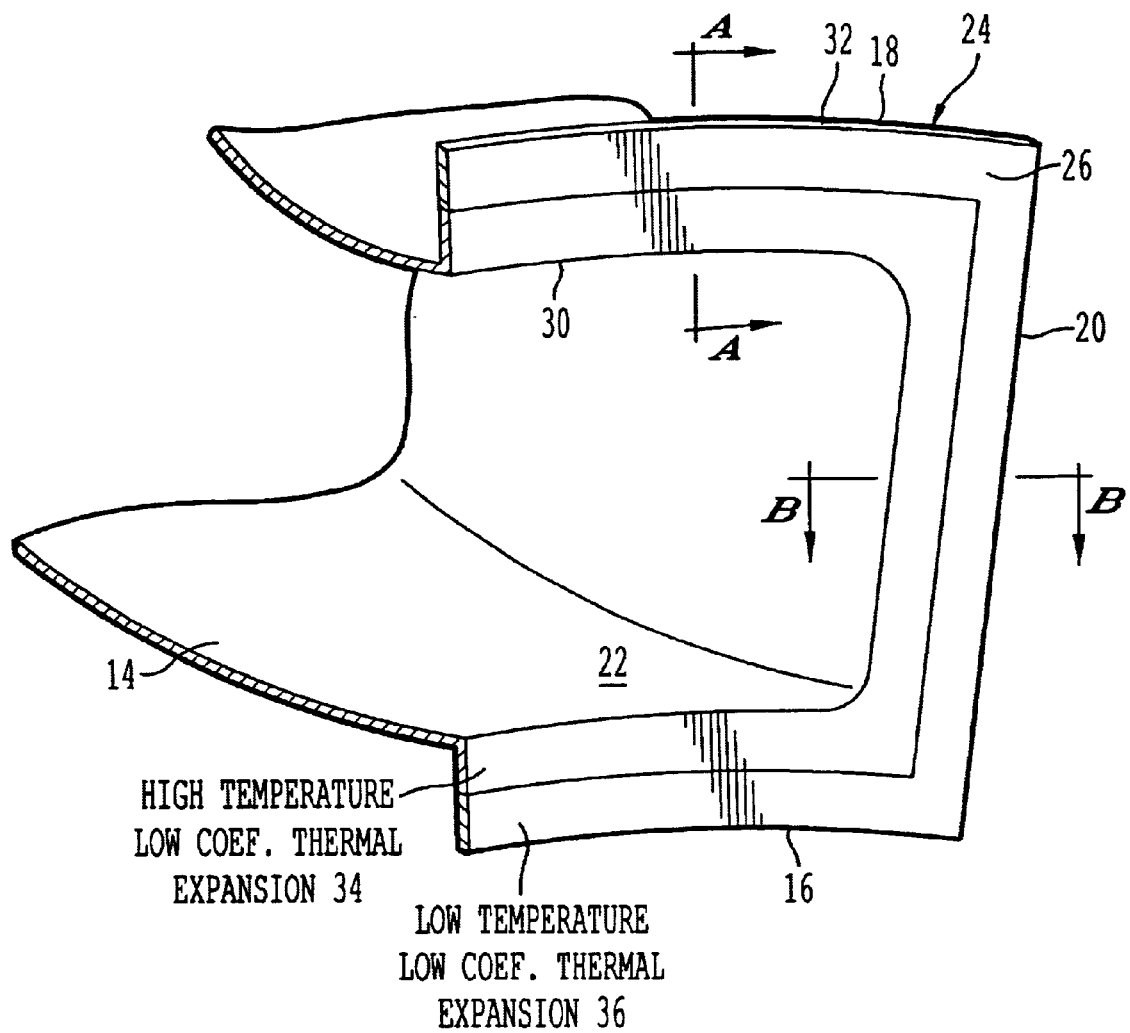
FIG. 2 is a perspective view of the end annular flange of the tail cylinder illustrated in FIG. 1.
Figure 3:
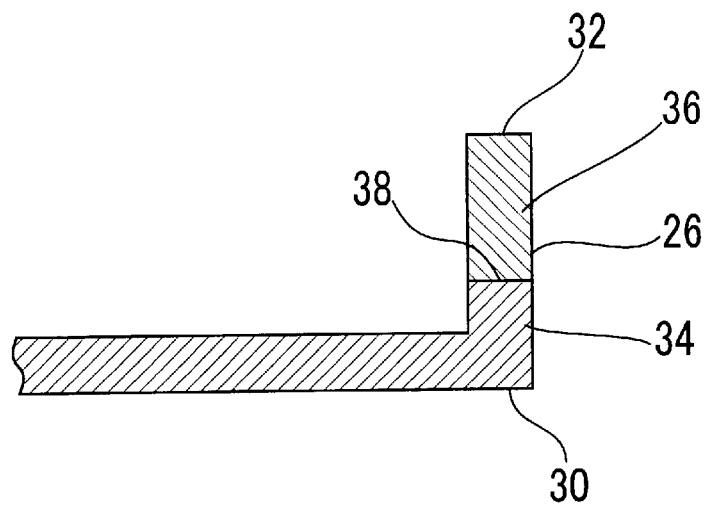
FIG. 3 is a cross-sectional view of the tail cylinder taken along lines A—A and B—B of FIG.2.
Figure 4:
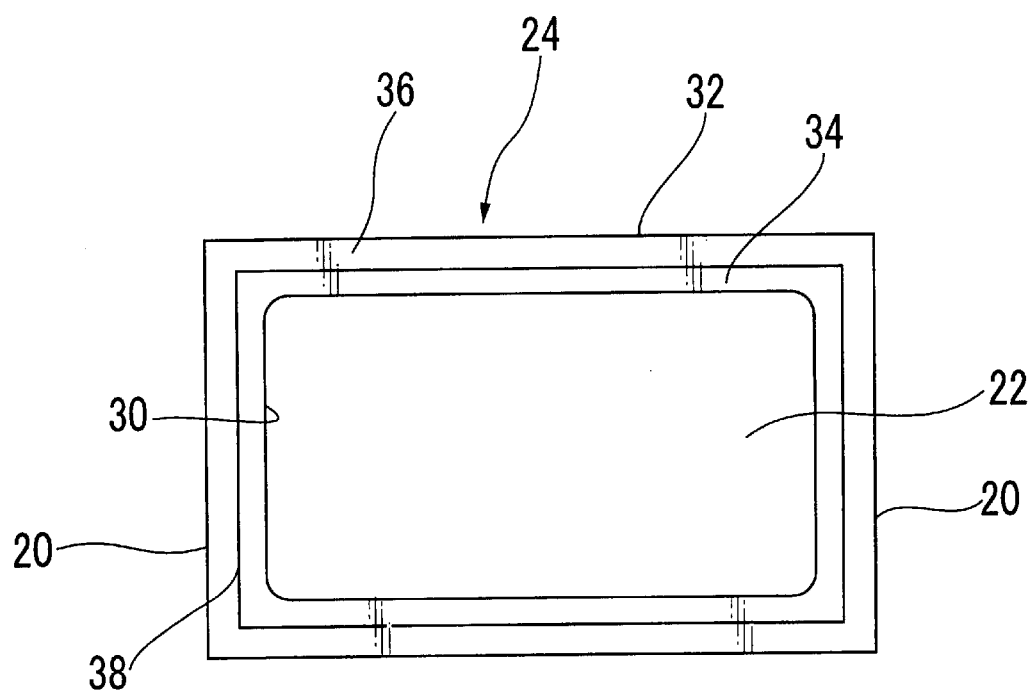
FIG. 4 is an end view of the end annular flange of the tail cylinder.
Figure 5:
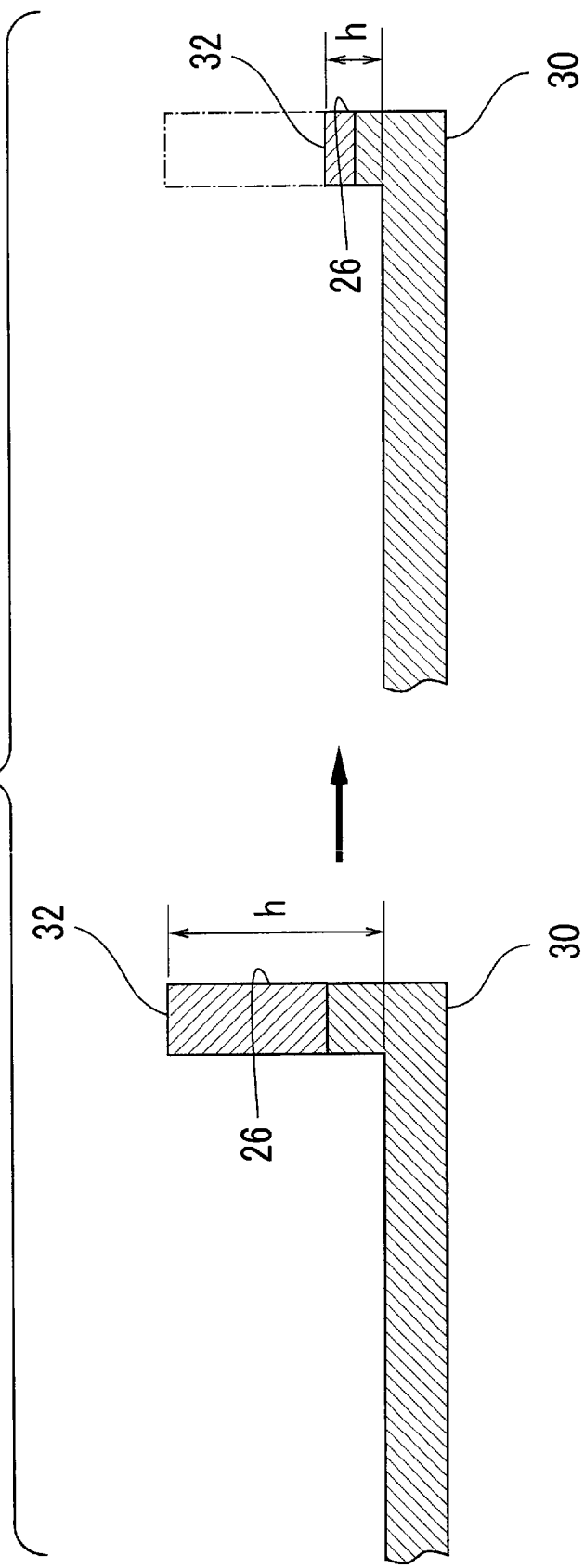
FIG. 5 is a cross-sectional view of a second preferred embodiment of the tail cylinder of the combustor in accordance with the present invention, illustrating in a manner same as in FIG. 3.

FIG. 1 is an enlarged cross-sectional view of a first preferred embodiment of a tail cylinder of a combustor in accordance with the present invention. FIG. 2 is a perspective view of the end annular flange of the tail invention. FIG. 2 is a perspective view of the end annular flange of the tail cylinder illustrated in FIG. 1. FIGS. 3 and 5 are cross-sectional views of the tail cylinder taken along lines A—A and B—B of FIG.2, respectively. FIG. 4 is an end view of the end annular flange of the tail cylinder.

A plurality of, for example, ten combustors 10 are circumferentially disposed around a central axis of a turbine rotor in an adjacent relationship to each other. As shown in FIG. 1, each of the combustors 10 comprises a cylindrical structure including a liner 12 with a combustion nozzle (not shown) attached at one end of the combustor 10 and a tail cylinder 14 connected to the liner 12. As shown in FIG. 2, the tail cylinder 14 includes a front portion 16 disposed proximally to the rotational axis of the turbine rotor (not shown), a back portion 18 disposed distally from the rotational axis of the turbine rotor, and two side portions 20 disposed to abut a side portion of an adjacent tail cylinder (not shown) disposed around the rotational axis of the turbine rotor, respectively.

In the tail cylinder 14 is a flow passage for combustion gas disposed longitudinally thereof toward the discharge opening 22, at the outer circumference of which opening an end annular flange 24 is provided to connect the tail cylinder 14 to a turbine casing (not shown). The end annular flange 24 has an abutment surface 26 extending radially outwardly from the discharge opening 22 for connecting the flange 24 to the turbine casing.

The discharge opening 22 is generally rectangular in shape, with the front portion 16 and the back portion 18 arranged as the long sides thereof, and with the side portions 20 arranged as the short sides thereof As shown in FIG. 3, the end annular flange 24 includes an outer portion 32 formed of a metal material having a coefficient of linear expansion greater than that of the metal material forming an inner portion 30 of the end annular flange. More particularly, as shown in FIG. 4, the end annular flange 24 includes a first annular portion 34 formed of a first metal material forming a circumferential portion of the discharge opening 22, and a second annular portion 36 formed of a second metal material having a coefficient of linear expansion greater than that of the first metal material, the second annular portion forming the circumferential portion of the first annular portion 34. Preferably, the first and second annular portions 34, 36 are joined to each other by welding with a flux having a coefficient of linear expansion between that of the first metal material and that of the second metal material. Preferably, as shown in FIG. 4, the joining surface 38 between the first annular portion 34 and the second annular portion 36 is located in a parallel relationship with respect to the discharge opening 22.

Preferably, the first metal is hastelloy-X which has a coefficient of linear expansion of 1.5 E-5 (1/° C.) (at 400° C.), while the second metal is either A-286 or SUS stainless steel both of which has a coefficient of linear expansion of 1.8 E-5 (1/° C.) (at 400° C.). A-286 is a more preferable material than SUS stainless steel due to its strength.

Preferably, the coefficient of linear expansion of the second metal material is 10% greater than the coefficient of the linear expansion of the first metal material, thereby eliminating the possibility of creating crackings due to the thermal fatigue.

Having described the features of the combustor 10 of the preferred embodiment of the invention, its operation will now be described in detail below.

In the normal operating state of the combustor 10, combustion gas is injected into the inner space of the liner 12 of the combustor 10 via one or more combustion nozzles (not shown), toward the discharge opening 22 of the tail cylinder 14. Then, the combustion gas is mixed with the air in the inner space of the combustor 10, and this mixture, i.e the working fluid, is supplied to the turbine rotor (not shown) through the discharge opening 22.

During this state of operation, the inner surface of the tail cylinder 14 is exposed to the combustion gas having a maximum temperature of 1500° C., while the outer surface of the tail cylinder 14 is exposed to the outer environmental ambient air, resulting in a temperature gradient of several hundreds of degrees in the direction of the thickness of the wall of the tail cylinder 14.

According to this embodiment of the present invention, by forming a portion exposed to a lower temperature from the second metal material having a coefficient of linear expansion greater than that of the first metal material forming a portion exposed to a higher temperature, the difference between the thermal expansion of the higher temperature portion of the first metal and that of the lower temperature portion of the second metal will become less due to the larger amount of expansion of the lower temperature portion (so-called bimetal effect) during normal operation, than would be in the case of the higher and lower temperature portions of the same materials, resulting in reduced amount of the bending deformation, thereby reducing the thermal stress due to the deformation, especially at the corner portions thereof, so as to eliminate the possibility of creating crackings due to the thermal fatigue to provide the combustor 10 with a prolonged service life.

Although the reduction of the thermal stress has been accomplished, in this embodiment, by utilizing the bimetal effect described above wherein all of the front, back, and sides portions are bimetal, another embodiment in which only one of these portion is bimetal is also effective in reducing the thermal stress.

Second preferred embodiment of the present invention will now be described in detail below. Where considered appropriate, reference numerals the same as those in the first embodiment have been indicated in the figures of the second embodiment to indicate elements corresponding to those in the first embodiment. FIG. 5 is a cross-sectional view of the second preferred embodiment of the tail cylinder of the combustor in accordance with the present invention, illustrated in the same manner as in FIG. 3.

As shown in FIG. 5, the end annular flange 24 of this embodiment has a lower height h than that of the previous embodiment to reduce the thermal stress. The height h can be selected depending upon the high temperature, the low temperature, and the characteristic of the metal material being used.

According to this embodiment of the present invention, by forming a flange portion with a low profile, the temperature of the inner surface of the tail cylinder, i.e., higher temperature portion, can be lowered, while the temperature of the outer surface of the tail cylinder, i.e., lower temperature portion, can be raised, the temperature difference between the two portions can be reduced, resulting in a reduced amount of bending deformation, thereby reducing the thermal stress due to the deformation, especially at the corner portions of the discharge opening of the end annular flange 24.

According to the embodiment described above, the reduction of the efficiency of the gas turbine system, which is caused by lowering the temperature of the higher temperature portion, can be prevented to a greater extent than in the case of the prior art wherein the temperature of the higher temperature portion is only lowered.

Figure 6:
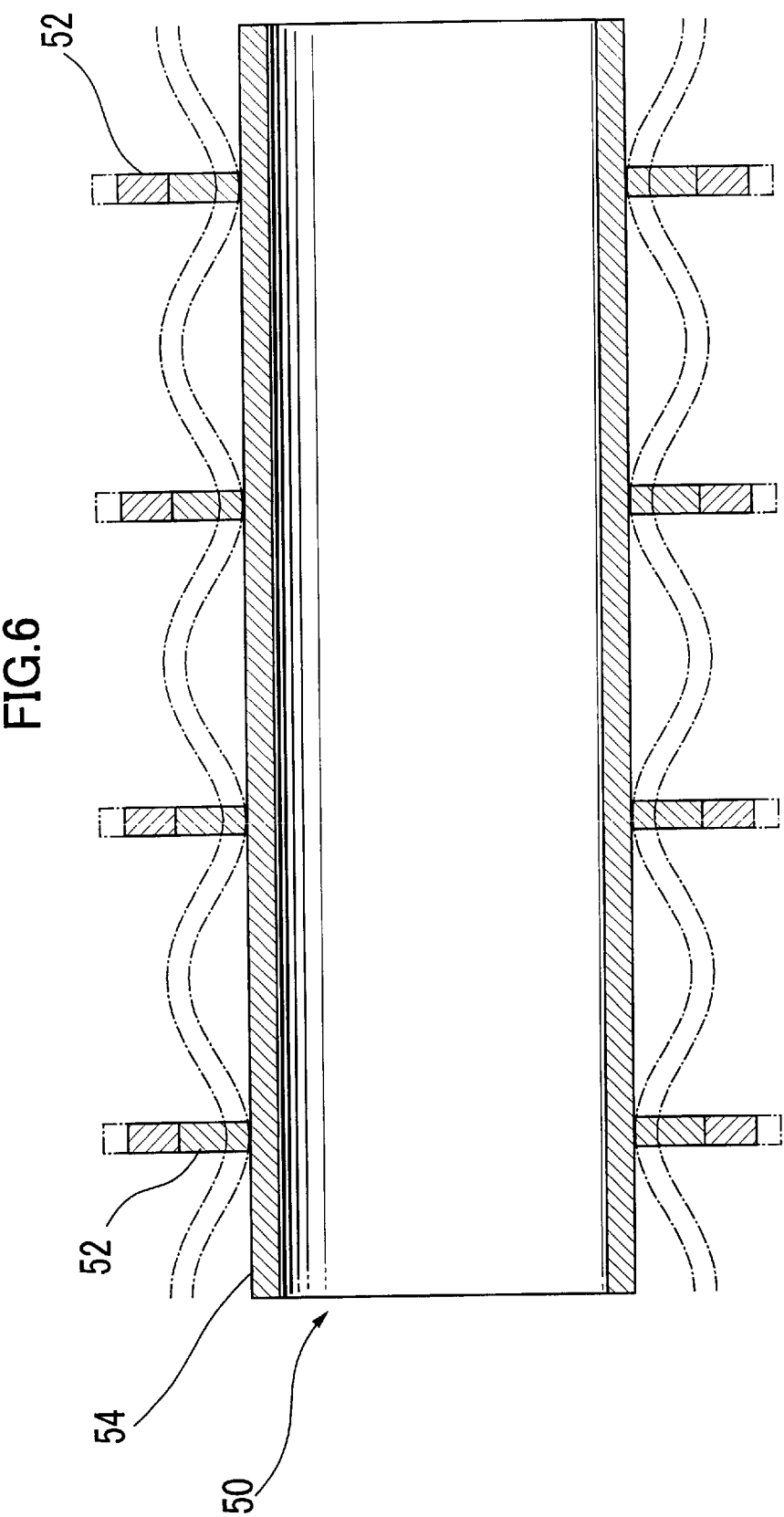
FIG. 6 is a general overview of a third preferred embodiment of the hollow structure with a plurality of flanges in accordance with the present invention.

A further preferred embodiment of the present invention will now be described in detail below. FIG. 6 is a general overview of a third preferred embodiment of the hollow structure with a plurality of flanges in accordance with the present invention.

A hollow structure, i.e. an exhaust duct 50, in this embodiment has a plurality of annular flanges 52 fixedly attached to the outer circumference 54 of the exhaust duct 50 in an equally spaced apart longitudinal relationship with each other. Each of the plurality of the annular flanges 52 is formed from a first metal material at a higher temperature portion of the exhaust duct 50, and a second metal material at a lower temperature portion of the exhaust duct 50, as in the first embodiment.

In this embodiment, when hot exhaust gas flows through the exhaust duct 50, the hollow structure, i.e. the exhaust duct 50, will be expanded outwardly, as shown by the dotted line, due to the wide range of a temperature gradient in the direction of the thickness of the wall of the duct 50, similar to the case of the combustor of the first embodiment. At this time, however, since the second metal material forming the lower temperature portion of the annular flanges 52 has a coefficient of linear expansion greater than that of the first metal material forming the higher temperature portion of the annular flanges 52, the flanges 52 can be expanded outwardly more than in the case of flanges consisting of one metal material. The deformation of the hollow structure between the annular flanges 52 will be reduced due to the thermal expansion of the second metal material of the flanges 52, thereby reducing the thermal stress at the portions where each of the plurality of the flanges 52 are attached thereto.

Although the invention has been described and illustrated with reference to the specific embodiments thereof, variations and modifications can be made without departing from the spirit of the invention. For example, although the end annular flanges 24 of this embodiment have a bimetal-like structure at respective entire peripheries, only one or more portion/portions thereof, such as the front portion, back portion, or side portions, can have such a structure.

In the embodiment described above, the metal material forming the inner portion 30 of the end annular flange 24 was hastelloy-X, which has been used conventionally for constructing the tail cylinder 14, but any other suitable materials can be utilized. In such a case, by forming the outer portion 32 of the end annular flange 24 from the metal material having a coefficient of linear expansion at least a certain amount greater than that of the metal material forming the inner portion 30 of the end annular flange 24, the amount of the bending deformation at the corners of the discharge opening of the end annular flange 24 can be reduced, thereby reducing the thermal stress due to the deformation thereat, resulting in a prolonged service life thereof.

According to the present invention described above, a gas turbine combustor in which the thermal stress around the end annular flanges thereof can be minimized during normal operation without damaging the efficiency of the gas turbine system has been provided.

According to the present invention described above, a hollow structure having at least one flange which can eliminate the possibility of creating crackings due to the thermal fatigue, and thereby having an improved durability, has been provided.

What is claimed is:

1. A hollow structure with a flange wherein at least one annular flange is fixedly attached around the hollow structure which has a temperature gradient in the direction of the thickness of the wall thereof comprising:

said at least one annular flange including an outer portion formed of a metal material having a coefficient of linear expansion greater than that of the metal material forming another portion of said at least one annular flange.

2. A hollow structure with a flange according to claim 1, wherein said hollow structure is one of a plurality of gas turbine combustors disposed cirumferentially around a central axis of a turbine rotor in an adjacent relationship each other including a generally tubular-shaped tail cylinder for providing a flow path of combustion gas flowing longitudinally toward the discharge opening thereof, said tail cylinder having an end annular flange at the outer circumference of the discharge opening thereof for connecting to a turbine casing, wherein the end annular flange comprising said at least one flange;

wherein said end annular flange including an outer portion formed of a metal material having a coefficient of linear expansion greater than that of the metal material forming another portion of said end annular flange.

3. A hollow structure with a flange according to claim 1, wherein said end annular flange including a first annular portion formed of a first metal material forming a circumferential portion of the discharge opening, and a second annular portion formed of a second metal material having a coefficient of linear expansion greater than that of the first metal material; wherein said first and second annular portions are joined each other by welding with a flux having a coefficient of linear expansion between that of the first metal material and that of the second metal material.

4. A hollow structure with a flange according to claim 3, wherein the coefficient of linear expansion of the second metal material is 10% greater than the coefficient of linear expansion of the first metal material.

5. A hollow structure with a flange according to claim 2, wherein said end annular flange including a first annular portion formed of a first metal material forming a circumferential portion of the discharge opening, and a second annular portion formed of a second metal material having a coefficient of linear expansion greater than that of the first metal material; wherein said first and second annular portions are joined each other by welding with a flux having a coefficient of linear expansion between that of the first metal material and that of the second metal material.

6. A hollow structure with a flange according to claim 5, wherein the coefficient of linear expansion of the second metal material is 10% greater than the coefficient of linear expansion of the first metal material.

7. A hollow structure with a flange according to any one of claims 1 to 6, wherein the metal material forming the inner portion of said flange is hastelloy-X, and the metal material forming the outer portion of said flange is A-286.

8. A hollow structure with a flange according to any one of claims 1 to 6, wherein the metal material forming the inner portion of said flange is hastelloy-X, and the metal material forming the outer portion of said flange is SUS stainless steel.

* * * * *